US011310152B2

(12) United States Patent
Karthikeyan et al.

(10) Patent No.: US 11,310,152 B2
(45) Date of Patent: Apr. 19, 2022

(54) COMMUNICATIONS NETWORK MANAGEMENT

(75) Inventors: Vidhyalakshmi Karthikeyan, London (GB); Detlef Daniel Nauck, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 13/997,485

(22) PCT Filed: Dec. 23, 2011

(86) PCT No.: PCT/GB2011/001772
§ 371 (c)(1),
(2), (4) Date: Jun. 24, 2013

(87) PCT Pub. No.: WO2012/085519
PCT Pub. Date: Jun. 28, 2012

(65) Prior Publication Data
US 2013/0311673 A1   Nov. 21, 2013

(30) Foreign Application Priority Data

Dec. 24, 2010 (EP) .................................... 10252222

(51) Int. Cl.
*G06F 15/16* (2006.01)
*H04L 45/00* (2022.01)
(Continued)

(52) U.S. Cl.
CPC ............ *H04L 45/22* (2013.01); *H04L 41/044* (2013.01); *H04L 41/0896* (2013.01);
(Continued)

(58) Field of Classification Search
CPC ... H04L 45/22; H04L 41/044; H04L 41/0896; H04L 41/147; H04L 41/5025; H04L 45/00; H04L 45/30; H04L 45/42
(Continued)

(56) References Cited

U.S. PATENT DOCUMENTS 5,774,669 A    6/1998  George et al.
6,308,174 B1  10/2001  Hayball et al.
(Continued)

FOREIGN PATENT DOCUMENTS

EP    1 351 441 A2   10/2003
EP    1 473 890      11/2004
(Continued)

OTHER PUBLICATIONS

International Search Report for PCT/GB2011/001772 dated Feb. 13, 2012.
(Continued)

*Primary Examiner* — George C Neurauter, Jr.
*Assistant Examiner* — Joel Mesa
(74) *Attorney, Agent, or Firm* — Nixon & Vanderhye PC

(57) ABSTRACT

The present invention provides a communications network which is divided into a plurality of segments, with, each segment comprising one or more routers and one or more communications links that connect the routers. Each of the segments also comprises a segment management module. Each of the segment management modules reports to a supervisory management module and the communications network may comprise one or more supervisory management modules. If a segment management module predicts that a QoS threshold will be breached then it may re-route a data flow within that segment. If such a re-route is not
(Continued)

possible then it will send a request to its supervisory management module to initiate a re-routing to a further segment.

20 Claims, 6 Drawing Sheets

(51) Int. Cl.
| | |
|---|---|
| H04L 41/0896 | (2022.01) |
| H04L 45/30 | (2022.01) |
| H04L 41/147 | (2022.01) |
| H04L 45/42 | (2022.01) |
| H04L 41/5025 | (2022.01) |
| H04L 41/044 | (2022.01) |

(52) U.S. Cl.
CPC ........ *H04L 41/147* (2013.01); *H04L 41/5025* (2013.01); *H04L 45/00* (2013.01); *H04L 45/30* (2013.01); *H04L 45/42* (2013.01)

(58) Field of Classification Search
USPC .......................................................... 709/239
See application file for complete search history.

(56) References Cited

U.S. PATENT DOCUMENTS

| | | | |
|---|---|---|---|
| 6,353,902 | B1 | 3/2002 | Kulatunge et al. |
| 6,657,954 | B1 | 12/2003 | Bird et al. |
| 6,802,020 | B1 | 10/2004 | Smith |
| 7,225,250 | B1 | 5/2007 | Harrop |
| 7,272,755 | B2 | 9/2007 | Smith |
| 7,383,191 | B1 | 6/2008 | Herring et al. |
| 7,746,789 | B2 | 6/2010 | Katoh et al. |
| 8,918,345 | B2 | 12/2014 | Kings |
| 2002/0141342 | A1 | 10/2002 | Furman et al. |
| 2003/0179703 | A1 | 9/2003 | Levy |
| 2004/0098457 | A1* | 5/2004 | Betge-Brezetz .... H04L 41/5025 709/204 |
| 2004/0103210 | A1* | 5/2004 | Fujii ........................ H04L 45/22 709/224 |
| 2004/0117226 | A1 | 6/2004 | Laiho et al. |
| 2004/0136324 | A1* | 7/2004 | Steinberg ................ H04L 45/04 370/254 |
| 2004/0153545 | A1 | 8/2004 | Pandya |
| 2004/0218582 | A1 | 11/2004 | Kennedy et al. |
| 2005/0256946 | A1* | 11/2005 | Childress ............... G06Q 10/06 709/223 |
| 2006/0062199 | A1 | 3/2006 | Yoshizawa |
| 2006/0111857 | A1 | 5/2006 | Shah et al. |
| 2006/0159021 | A1 | 7/2006 | Asghar et al. |
| 2007/0101202 | A1 | 5/2007 | Garbow |
| 2007/0121509 | A1 | 5/2007 | Taylor et al. |
| 2007/0174449 | A1 | 7/2007 | Gupta |
| 2007/0280127 | A1 | 12/2007 | Connor et al. |
| 2008/0002576 | A1 | 1/2008 | Bugenhagen et al. |
| 2008/0049641 | A1 | 2/2008 | Edwards |
| 2008/0189225 | A1 | 8/2008 | Herring et al. |
| 2008/0215355 | A1 | 9/2008 | Herring et al. |
| 2008/0273591 | A1 | 11/2008 | Brooks et al. |
| 2009/0028056 | A1 | 1/2009 | Rahman et al. |
| 2009/0132864 | A1 | 5/2009 | Garbow |
| 2009/0240644 | A1 | 9/2009 | Boettcher et al. |
| 2010/0226390 | A1* | 9/2010 | Yan ........................ H04L 47/762 370/468 |
| 2012/0020216 | A1 | 1/2012 | Vashist |
| 2012/0144038 | A1 | 6/2012 | Hildebrand |
| 2013/0010610 | A1 | 1/2013 | Karthikeyan |

FOREIGN PATENT DOCUMENTS

| | | |
|---|---|---|
| WO | 02/45315 | 6/2002 |
| WO | 02/080458 | 10/2002 |
| WO | 2006/036475 | 4/2006 |
| WO | 2007/048738 | 5/2007 |
| WO | 2010/112855 | 10/2010 |

OTHER PUBLICATIONS

Awduche et al., "Requirements for Traffice Engineering over MPLS"; Network Working Group Memo, UUNET (MCI 1999, (26 pgs.).
U.S. Appl. No. 13/997,445, filed Jun. 24, 2013, Communications Network Management.
U.S. Appl. No. 13/997,485, filed Jun. 24, 2013, Communications Network Management.
U.S. Appl. No. 13/997,529, filed Jun. 24, 2013, Communications Network Management.
U.S. Appl. No. 13/997,562, filed Jun. 24, 2013, Communications Network Management.
Office Action dated Oct. 7, 2015 issued in co-pending U.S. Appl. No. 13/997,445.
Office Action dated Sep. 23, 2015 issued in co-pending U.S. Appl. No. 13/997,529.
International Search Report for PCT/GB2011/001773 dated Feb. 23, 2012. 3 pages.
International Search Report for PCT/GB2011/001774 dated Feb. 24, 2012. 3 pages.
International Search Report for PCT/GB2011/001733 dated Mar. 22, 2012. 3 pages.
T. Anjali et al., A New Scheme for Traffic Estimation and Resource Allocation for Bandwidth Brokers, Computer Networks, vol. 41, No. 6, Apr. 22, 2003, pp. 761-777.
Office Action dated Sep. 1, 2015 issued in co-pending U.S. Appl. No. 13/997,562.
Office Action dated Feb. 26, 2016 in U.S. Appl. No. 13/997,529, 13 pages.
Office Action dated Feb. 26, 2016 in U.S. Appl. No. 13/997,445, 13 pages.
Office Action dated Mar. 10, 2016 in U.S. Appl. No. 13/997,562, 14 pages.
Office Action dated Dec. 2, 2016 in related U.S. Appl. No. 13/997,562.
Office Action dated Nov. 4, 2016 in related U.S. Appl. No. 13/997,529.
Office Action dated Nov. 3, 2016 in related U.S. Appl. No. 13/997,445.
Examination Report dated Dec. 6, 2017 in European Application No. 11805125.9, 5 pages.
Examination Report dated Feb. 4, 2019 in European Application No. 11805125.9, 6 pages.
"A Path Computation Element (PCE)-Based Architecture; rfc4655. txt", Farrel Old Dog Consulting J-P Vasseur Cisco Systems Inc., et al., XP015047407, Aug. 1, 2006, 40 pages.
Decision to Grant dated Feb. 20, 2020 in European Application No. 11805125.9, 2 pages.
Goff, T. et al. "Preemptive Routing in Ad Hoc Networks", Journal of Parallel and Distributed Computing, vol. 63, No. 2, Feb. 1, 2003, pp. 123-140.
Vilalta, R. et al., "Predictive Algorithms in the Management of Computer Systems", IBM Systems Journal, Jul. 2002, vol. 41, No. 3, pp. 461-474.
R. Agrawal et al., "Mining Association Rules Between Sets of Items in Large Databases", IBM Almaden Research Center, Sigmod Record, ACM, vol. 22, No. 2, Jun. 1, 1993, pp. 207-216.
Cai Zhongtang et al. "Utility-Driven Proactive Management of Availability in Enterprise-Scale Information Flows", College of Computing, Georgia Institute of Technology, Atlanta, GA and IBM Watson Research Center, Hawthorne, Ny, IFIP International Federation for Information Processing, Middleware 2006 Lecture Notes in Computer Science, Jan. 1, 2006, pp. 382-403.
Markopoulou, A. et al. "Characterization of Failures in an IP Backbone", EE Department, Stanford University, CA; Sprint ATL, Burlingame, CA; ECE Department, UC Davis, CA; Intel Research, Cambridge, UK; IEEE, 2004 (11 pgs.).
Li, Q. et al. "The Routing Protocol of AODV Based on Link Failure Prediction", School of Information engineering, Wuhan University

(56) References Cited

OTHER PUBLICATIONS of Technology, Wuhan, China and School of Electrical engineering, Wuhan Navy Engineering University, Wuhan, China, IEEE, 2008 (4 pgs.).

* cited by examiner

COMMUNICATIONS NETWORK MANAGEMENT

This application is the U.S. national phase of International Application No. PCT/GB2011/001772 filed 23 Dec. 2011 which designated the U.S. and claims priority to EP 10252222.4 filed 24 Dec. 2010, the entire contents of each of which are hereby incorporated by reference.

TECHNICAL FIELD

The present invention in certain example embodiments relates to the operation of communications networks and in particular to the autonomic operation of communications networks.

BACKGROUND AND SUMMARY

It will be understood that there are a number of different approaches to network capacity management for communications networks. If the network is yet to be built, then over-provisioning is the easiest method. Network capacity can be determined on the basis of network demands forecasts and modeling, with the expectation that the demand placed upon the network does not exceed the provisioned limit. The process of putting in more capacity once this limit has been exceeded is laborious and might even require engineers to lay more cable and connect them back into the network. Evidently, this method is very static.

Alternatively, once a network becomes overloaded, services undergo admission control at the edge of a congested network based on current availability in the network to accommodate the incoming new flow. This technique is as old as the Public Switched Telephone Network (PSTN) and has been implemented using logical units such as Bandwidth Brokers and protocols such as RSVP (within the Integrated Services framework). Traditional call admission only looks at allowing a service, or data flow, access into the network. It does not address the problem of gradual underperformance of a service while being assigned to a specific sequence of resources. This becomes increasingly important when the number of services delivered on the IP networks and the variety in the Quality of Service guarantees they require expands with the introduction of TV and gaming content from numerous content providers.

According to a first aspect of the present invention there is provided a communications network comprising: a plurality of network segments, each of the plurality of network segments comprising a segment management module, one or more routers and a plurality of communications links, the communications links connecting each router to one or more other routers; and a supervisory management module, wherein, in use, the network is configured such that each segment management module predicts the performance of the or each router in its respective segment that carries a data flow based on operational data reported by the or each router and if the predicted performance exceeds a threshold value, that segment management module will a) identify an alternative routing for the data flow within that network segment; or b) if an alternative routing for the data flow cannot be found within that network segment, send a report to the supervisory management module, the supervisory management module being configured to, in use, take action in response to the report.

According to a second aspect of the present invention there is provided a method of managing a communications network, the communications network comprising: a plurality of network segments, each of the plurality of network segments comprising a segment management module, one or more routers and a plurality of communications links, the communications links connecting each router to one or more other routers; and a supervisory management module, the method comprising the steps of: i) each segment management module predicting the performance of the or each router in its respective segment that carries a data flow based on operational data reported by the or each router and if the predicted performance exceeds a threshold value, that segment management module will ii) identify an alternative routing for the data flow within that network segment; or iii) if an alternative routing for the data flow cannot be found within that network segment, send a report to the supervisory management module, the supervisory management module being configured to, in use, take action in response to the report.

According to a third aspect of the present invention there is provided a data carrier device comprising computer executable code for performing a method as described above.

BRIEF DESCRIPTION OF THE DRAWINGS

Embodiments of the present invention will now be described, by way of example only, with reference to the accompanying drawings in which.

DETAILED DESCRIPTION

Figure 1:
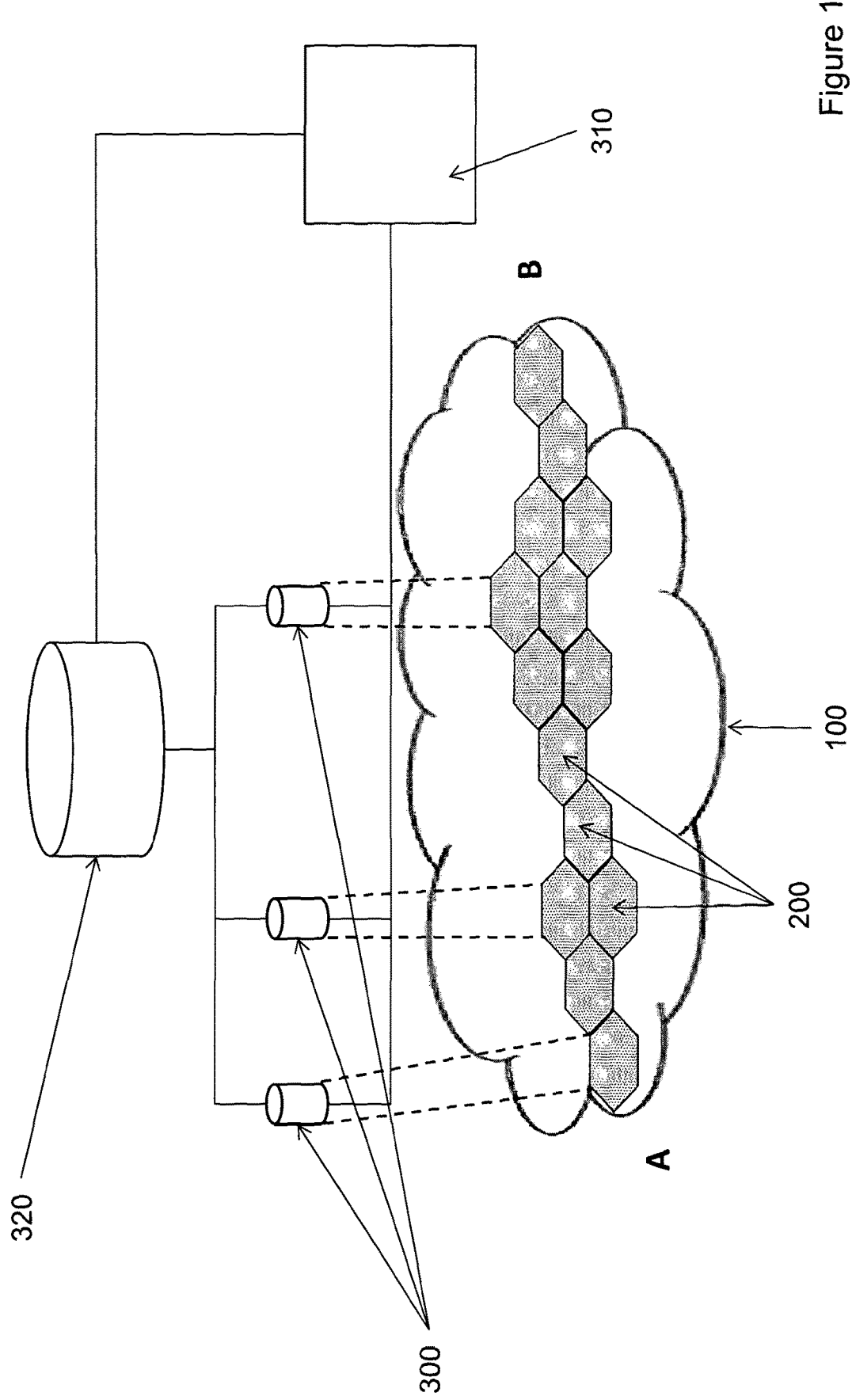
FIG. 1 shows a schematic depiction of a communications network which comprises a plurality of different network segments.

FIG. 1 shows a schematic depiction of a communications network 100. A path across the communications network 100, for example between points A and B, can be considered to be comprised of a plurality of different network segments 200. Each of the plurality of network segments 200 is associated with a respective network segment management module 300. For the sake of clarity FIG. 1 shows only a subset of the plurality of network segments which lie on or near to an approximate route from point A to point B across the network. It will be understood that the network can be considered to comprise more network segments than are shown in FIG. 1. Furthermore, only some of the plurality of network segment management modules 300 are shown in FIG. 1.

Figure 2:
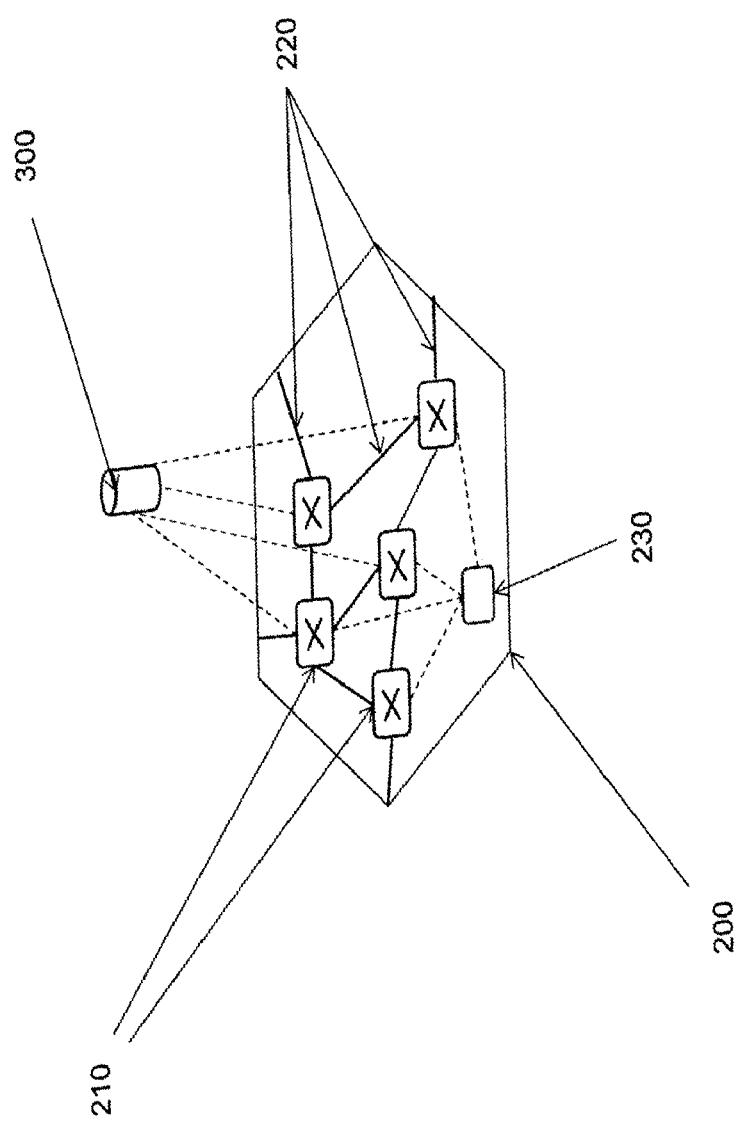
FIG. 2 shows; a schematic depiction of a network segment.

FIG. 2 shows a schematic depiction of one of the plurality of network segments 200 which comprises one or more network routers 210 and one or more communications links 220. The communications links 220 interconnect the network routers 210 within the network segment 200 and also provide connections outside the network segment, for example to network routers within other network segments or to destinations at the edge of the network, for example points A or B. These destinations at the edge of the network may comprise a node that is generating or receiving data or a gateway to further networks. A network segment may also comprise other elements such as switches, bridges, etc.

Referring to FIG. 1, consider a flow of traffic from Point A to Point B when the network is only lightly loaded. While standard Internet Protocols provide no guarantee that the end-to-end pathway of two consecutive packets will be the same, a change is only likely to occur if the state of a link or router changes or if a link is being overloaded such that the QoS parameters are exceeding acceptable limits. Therefore, assuming that the network begins in a stable condition then it follows that it is reasonable to assume that at least some consecutive packets will follow the same pathway across the network between Points A and B. As can be seen from FIG. 1, the communications network 100 is divided into a number of network segments. A route between endpoints A and B is likely to pass through a set of the shaded segments that are shown in FIG. 1. It is possible to define a set of quality of service (QoS) parameters and associated parameter limits that are valid for the end-to-end path across the network from A to B. For example the set of QoS parameters, P, may be defined as:

$$P=\{delay, jitter, loss\} \quad [1]$$

but it will be understood that other parameters may be used in addition, or in the alternative. If the values of these QoS parameters exceed predetermined values which represent acceptable QoS boundaries then a SLA (Service Level Agreement) may be breached. In order for the flow of data through each of the network segments to be managed it is necessary to provide segment-specific QoS parameters to the management modules 300 associated with each of the segments in the route. These parameters, $P_a$, represent the limits to the various QoS parameters that apply to the transmission of data for the local segment a for that service session. This can be expressed as "per router or per link, this service can tolerate x seconds of delay, y seconds of loss and z seconds of jitter given that the service flow traverses a range of m-n routers in total from source to destination".

These QoS parameters can be defined centrally, obtained using operator expertise, or derived periodically by the segment management module on a per flow or per service category basis depending on the proportion of links/routers that the service traverses in that segment compared to the end-to-end distance. The overall QoS thresholds for each segment can be derived from this ratio, based on the size of the segment in comparison to the end-to-end chain.

Regardless of the manner in which this information is obtained, the QoS parameters are either communicated directly to each of the segment management modules or are held in a separate network management database 305. Each of the segment management modules are in communication with the network management database 305 such the network management database can be queried by a segment management module and the associated segment QoS parameters are returned to the management module. As a result, each of the segment management modules will have, for a given service flowing through the network, an array $P_a$ that states the maximum allowable QoS parameters for that particular segment in order that the overall QoS satisfies the SLA.

In order to be able to be able to monitor these parameters in real time it is necessary to translate them into one or more parameters that are easily accessible from the routers 210 that are present in the different network segments. For example, it is possible to access a wide range of local router parameters from the Management Information Base (MIB). These parameters can include, without limitation, ingress/egress buffer availability, router response time, router on/off status, link capacity, rate of ingress and egress traffic flows (the ratios of these flows to buffer occupancy as well as the trend of this over time), and packets discarded on the ingress/egress due to various faults (e.g. buffer overflow, software errors).

Put more formally, it is necessary to express $P_a$ in the generic form $$P_a=f(d,e,f,g) \quad [2]$$

and to determine the function f and the parameters d, e, f & g which are equivalent to $P_a$. It is known to perform such translations using either linear regression or, if necessary, a non-linear regression technique such as, for example, a multi-layer perceptron. It will be understood that linear regression is easier to implement and should provide sufficient accuracy. It should also be understood that if suitable router parameters can be found from another source, such as from an aggregator entity (as described below) or another protocol or set of flooded LSAs that have already been implemented to collect such network performance data, then it is possible to use this alternative source of parameters to determine the equivalent expression of $P_a$. Similarly, an alternative method of translating the router parameters in order to determine $P_a$ could be used.

Thus it is possible to monitor a selected subset of parameters that directly reflect the operational performance of each of the routers in the network segments of interest and use this information in order to determine the value of $P_a$ in real time. Once the values of $P_a$ are determined for each network segment then it is possible to use this data to predict when the performance of the network is likely to lead to the SLA being breached, either when considering one or more segments in the network, or an end-to-end network path. The output required from the network as a result of this step is a "near real-time progress report" of the performance of every individual, or class of, service flow in the network.

The actual values of the required router parameters may be obtained by each of the segment management modules periodically polling each of the routers that are comprised within their respective network segments. Alternatively, each of the routers may 'push' the required router data to the segment management modules on a periodic basis or as and when parameter values change. Alternatively, an aggregator entity 210 could be implemented to perform the mapping function f and pass the instantaneous QoS matrix it calculates from all its router sources to the segment management module, which then makes predictions based on this QoS data.

Once the performance data has been collected then it will be understood that predictions of potential underperformance can be made in a number of different known ways. One of the simplest methods is to use trend analysis. For example, if the buffer occupancy has increased over the past n periods, then it is likely that delays in the router will increase and therefore exceed the acceptable local threshold after the next m periods. Alternatively, if the number of packets discarded from a UDP voice call flow increases over n periods, then it is likely that the loss of packets will exceed acceptable thresholds after m periods if the same trend continues. In addition to this, it is possible to use association rule mining that learns from historical data. This could lead to rules such as "if parameters {d, e, f, g} maintain values {$d_a$, $e_a$, $f_a$, $g_a$}, then the QoS parameters $P_a$ are likely to be exceeded within the next m time periods".

Such rules can then be used in real-time by the segment management modules. Association rule mining is a known technique and there are several known learning methods (for example, decision and regression trees or neural networks, see T Mitchell, "*Machine Learning*", McGraw-Hill Science/Engineering/Math, 1st edition, 1997) that could be used to make these predictions and to map these predictions to specific parameter values in the form {$d_a$, $e_a$, $f_a$, $g_a$}. The segment management modules compares the real-time parameter inputs it receives from its routers to the criteria required by these predictions. This can be done by comparing the rules stored in a database to the incoming parameters and automatically triggering a subsequent action when a rule is fulfilled. It will be understood that this can be done according to class of service or on a per flow basis. This distinction might be necessitated by various services from different providers requiring different SLAs and QoS parameters, therefore leading to different rules for each class of service and/or flow.

If such a rule is triggered then it will be understood that the consequent action to be performed could comprise one or more of a large range of actions in order to prevent network congestion building up at one or more particular routers along one or more communications links within a given network segment. It is thought that one appropriate response is to spread data across the network segment, based upon historical knowledge of how much data that other currently available communications links in that segment can tolerate whilst still being able to sustain the locally assigned SLA. It will be understood that all of the traffic being transmitted over that link may be re-distributed, or alternatively just a fraction of the data can be re-distributed. A further advantage of such a re-assignment of some or all of the traffic from an underperforming link is that the reduction of the load on that link should provide an opportunity for the performance of that link to recover and to minimize the effect of its underperformance until a recovery has been effected.

For example, if there are two possible routes to a destination and the primary route is reaching capacity, such that it is likely to lead to congestion, then sending a certain percentage of traffic via the secondary route, even if it is not be able to take 100% of the primary route's traffic, is likely to be better than keeping the primary route fully occupied.

This re-routing of some or all of the data can be achieved either using link information from IP routing tables and/or using other rules learnt from historical performance of the communications links in the network segment. In one such method, the segment management module will poll the router that is upstream of the most underperforming routers in order to learn about the next best hop to replace the suffering link. It is recommended to poll the router that precedes the suffering link as it is likely that this has the most up-to-date information about its next best hops. Should the polling cause too much overload on the router itself, one could poll any router nearby (not necessarily only upstream) if a link-state protocol such as OSPF is being implemented at the IP layer. In the case of distance vector protocols such as BGP or RIP, it is necessary to poll the router preceding the suffering link because no other router will actually have the required next best hop information.

The next best hop may be within the same network segment or it may be in a different network segment. If it is in the same network segment, then a rule repository about the prior performance of the next hop link can be consulted to decide how much of the data can be offloaded onto the new link, given the current occupancy and expected performance of the proposed next hop. Alternatively, the data distribution can be done randomly across all the links that could be used to carry that particular service. In a further alternative, the traffic may be distributed evenly across some or all of the available links, or the traffic may be distributed in a manner which is proportional to the available capacity on these links.

If such a rule regarding the prior performance of new next hop does not exist in the rules repository, then the decision as to whether to re-route traffic over this hop will be made based only on the current loading of the next hop and the services that are being transported over it.

Once the decision to re-route traffic has been made then it will be logged by the network segment management module, so that the effect of the re-routing can be stored and this historical performance data may then be used when making subsequent decisions regarding the re-routing of traffic.

In the case where the next hop is located within the same network segment as the suffering link, once it has been decided how much data to re-route, and the next hop(s) over which it is to be re-routed, then it is necessary to implement a mechanism which distributes the re-routed traffic onto the new next hop(s). For some cases it may be appropriate to decide to offload all the data from an overloaded link if it is predicted that the link will fail entirely within a predicted timeframe (see, for example, the Applicant's co-pending application EP10250540). This may be achieved, for example by increasing the link cost, thus releasing the link entirely from the network.

If the management of the network 100 is based solely on decisions that are made within the individual segments of the networks, then there is a possibility that inefficient or inappropriate routing decisions may be taken, as each of the segment management modules does not have any information regarding the end-to-end QoS for the service flow over a large network is large. This can lead to the following situations occurring:

- a segment that is under stress could be pressured to meet local QoS targets when the end-to-end QoS measures are well below their respective thresholds;
- a handover process might be triggered when not necessary, resulting in extensive overhead in setting up the data re-routing as well as reporting the change to other network management systems;
- as the size of the monitored network increases, the iterative handover process requires a prediction period that is longer than might be necessary because the first alternative route might not be suitable, and several alternatives might need to be investigated before an acceptable alternative is found
- the inability to avoid a detrimental effect elsewhere within the network by forcing a network segment with acceptable performance to deteriorate the service provided.

In the network management system discussed above, if it is not possible for a segment management module to fix a local fault, possibly within a defined time period, then this can lead to an alarm being issued. The present invention in certain example embodiments provides a network management system which should significantly decrease the number of such alarms that are issued.

FIG. 1 further shows a supervisory network management module 320 which is in communication with each of the plurality of network segment management modules 300. A network management database 310 is in communication with both the supervisory network management module and the plurality of network segment management modules. The supervisory network management module can function in two different methods. Firstly, if the segment management modules make local decisions to optimize each individual part of the network, but only once service degradation has occurred, then the supervisory module can add an overlay to those network segment management modules. Secondly, the supervisory module can add an overlay to the proactive segment management modules discussed above with reference to FIG. 1. In the first case, the processing and responses of the supervisory module have to be quick enough that it can react to network speeds so that data is not lost while the processing is taking place. For both methods of operation, the purpose of the supervisory module is to reduce the number of handovers made between the local entities by preventing unnecessary handovers from being triggered.

In operation, the supervisor module has access to real time performance data from each of the network elements in each of the network segments which comprise the communications network 100, and these are expressed as real-time QoS parameters P. The supervisory module will receive periodic updates for these QoS parameters P for each locally managed network segment, for a given class of service, thereby enabling the supervisory module to make predictions about the future health of a given network segment (alternatively, if a local management entity is already in place such as that described above these predictions can be inherited directly instead of the supervisor module having to replicate the local management's actions). These predictions can be made using a number of different methods, which may include knowledge held by a network operator regarding prior experience about a network segment. Another automated technique of making this prediction is to use an association rule miner or a time series analysis for each QoS parameter, as described above with regard to the segment management modules.

If one of the network segments determines that a communications link within that segment will soon become overloaded, then this change will be communicated to the supervisory module. If that network segment is able to re-route the data solely within the network segment then there is no need to invoke the functionality of the supervisory module. However, if it is not possible to re-route the data within that segment, then the network segment management module will send a message to the supervisory module regarding the data which it is not able to re-route.

The supervisory module has an overview of the entire end-to-end route across the network, the QoS thresholds for the end-to-end route and the QoS thresholds assigned for each of the different network segments that the end-to-end route passes through. Thus, typically, a segment management module will send a re-routing request to the supervisory module because the segment is unable to continue to transmit the data without breaching one or more of the QoS thresholds associated with that segment. If the supervisory module is able to determine that a number of the other segments in the end-to-end path are operating sufficiently below their respective thresholds then it may permit the network segment that sent the re-routing request to carry on transmitting data via the original route.

As is discussed above, the QoS threshold parameters, $P_a$, for each of the segment management modules can be stored within the network management database 310 and these parameters can be accessed by the supervisory module. If there is a small number of overloaded segments within a network route then it may be possible to vary these threshold parameters, $P_a$, in order to decrease the number of handovers and thus provide more effective network usage. When the supervisory module receives a request from a segment management module to initiate a handover, it will check the real-time performance of each of the network segments in the end-to-end network route to determine which segments, if any, are performing better than expected and are predicted to perform better than expected. If such segments are found then it is possible to adjust the QoS parameters for the overloaded segment, for example by a margin of δ, so that the QoS parameters are defined by:

$$P_a = \{x_a + \delta_a, y_a + \delta_b, z_a + \delta_c\} \quad [3]$$

The QoS parameters of the well-performing segment will then be decreased correspondingly, such that they are defined by:

$$P_a = \{x_a - \delta_a, y_a - \delta_b, z_a - \delta_c\} \quad [4]$$

where $\delta_a$, $\delta_b$ and $\delta_c$ are the respective margins for each QoS parameter. It will be understood that if the adjustment may involve one segment having its parameters increased by a particular margin and another segment having a corresponding decrease in its QoS parameters. In some cases it may be necessary to decrease the QoS parameters of a number of network segments in order to be able to increase the QoS parameters of one network segment (or a small number of segments). In any case, the total of the QoS parameters across the end-to-end network route must remain constant, in order that pre-agreed service level agreements can be met. If not all of the QoS parameters for a given segment (or segments) are predicted to exceed their thresholds then it is not necessary to vary the margin for those parameters, for example if a segment is expected to underperform with respect to the delay threshold but is predicted to have an acceptable jitter performance then only the threshold for delay will be increased whilst the jitter threshold will remain unchanged. The variations in margin may be determined on the basis of a predetermined constant value, a percentage of the initial threshold value or may be determined by an algorithm that weights the margin value in accordance with the expected performance of a network segment or other factors. Once the QoS parameter values have been determined for the overloaded segment(s) then they will be updated in the network management database and will be transmitted to the relevant network segment management modules. These segment management modules will then apply the new QoS parameter values and thus if it is no longer necessary to re-route the data then the re-routing will not occur.

In the event that none of the network segments is performing better than was predicted then it will not be possible for the QoS threshold of an overloaded segment to be increased in such a case. In such an event, the supervisory module may return to a segment management module which has reported that it needs to re-route data to another segment a list of adjacent network segments which are potential candidates to receive re-routed data. The supervisory module may remove unsuitable network segments, for example because they lack the security required by the data stream that is to be re-routed. By providing a restricted list of segments for re-routing then the effort required of the segment management module to re-route the data can be reduced.

Note that if a segment that is expected to perform better actually does not live up to this expectation, then this will be seen when it requests permission to initiate handover at a later stage because it has not been able to meet the expected higher standards. This might result in an oscillation effect but this can be learnt over time and certain segments can be marked as being unable to perform as well as expected (i.e. rule_miner_2) and therefore smaller quantities of data can be pushed through to them when the same situation arises again (this is similar to the procedure behind route flap damping).

It should be understood that the supervisory module is only able to route traffic from overloaded segments to segments which have are under-loaded and which are performing better than had been predicted. If there are no under-loaded segments then re-routing traffic will only re-route overload conditions between different network segments. If the supervisory module permits data to be rerouted on a frequent basis then this may cause an alarm to be generated as it may indicate that the network is nearing its capacity and that the autonomous fixes provided by the supervisory module are no longer sufficient to address the problem.

Figure 3:
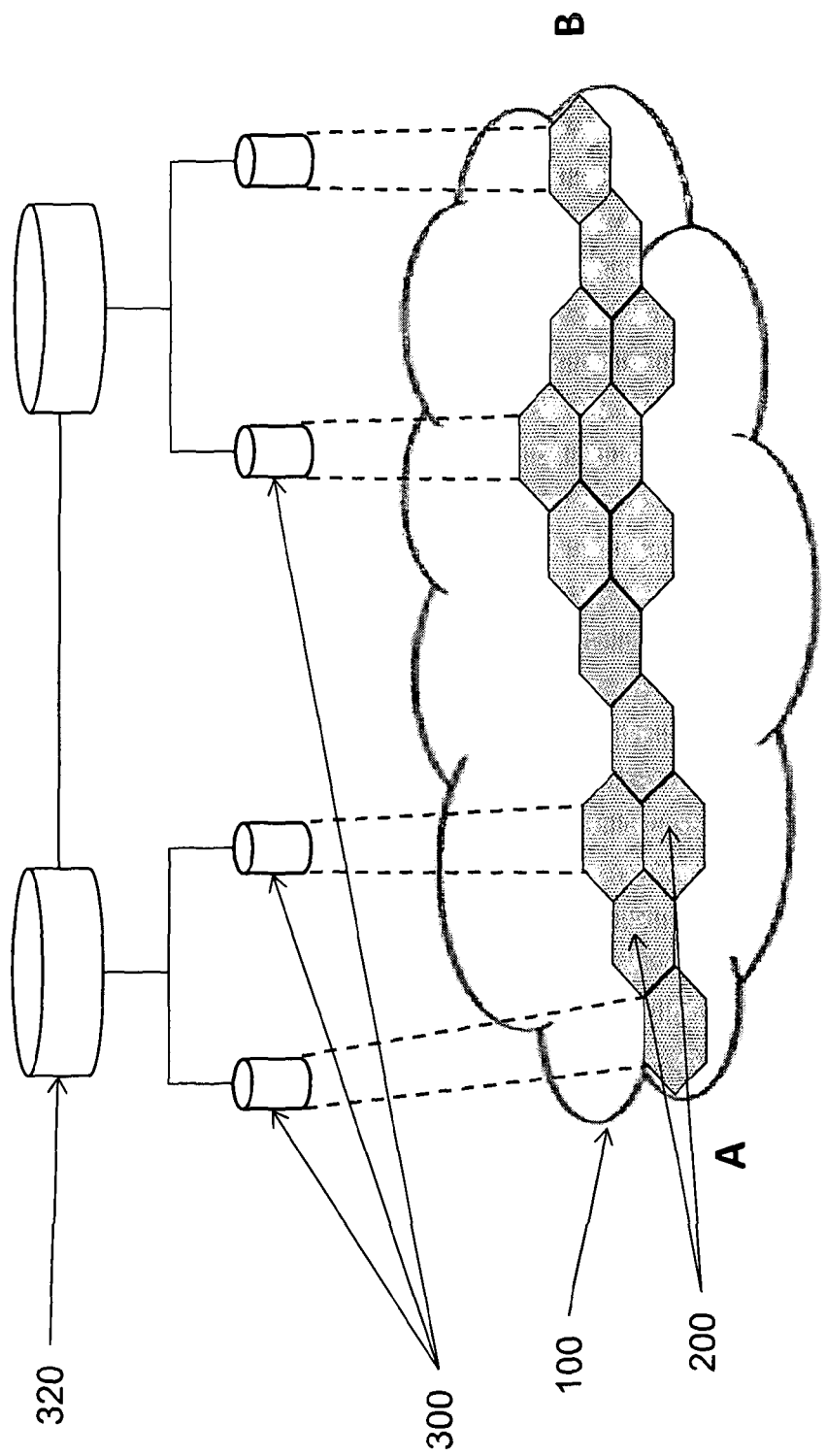
FIG. 3 shows a schematic depiction of a further example of a segmented communications network.

If a network has a large number of segments then it may not be possible for all of the segment management modules to be overseen by a single supervisory management module. FIG. 3 shows a schematic depiction of a communications network in which a number of supervisory management modules 320 each are responsible for communications with a subset of the segment management modules 300. The network operates as described above. If a request for a re-routing of traffic from one network segment to another segment is made, then this request will be made to the appropriate supervisory management module. That supervisory management module will attempt to adjust the QoS parameters for the overloaded segment based on the other segments that it is supervising which may be performing better than had been previously predicted. It will be understood that this hierarchical arrangement of supervisory modules may comprise more than the two levels that are shown in FIG. 3.

Figure 4:
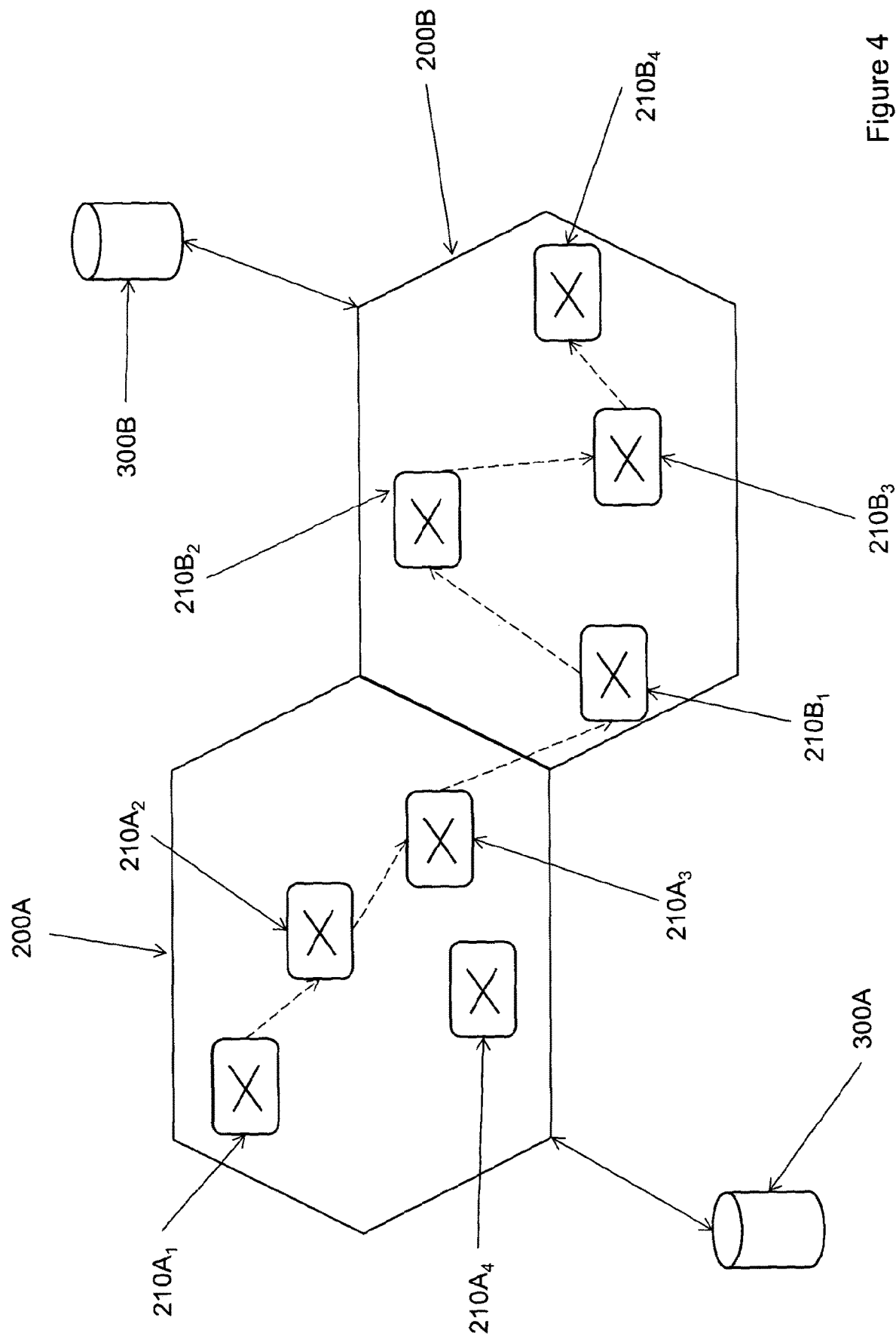
FIG. 4 shows a schematic depiction of a further example of a network being operated in accordance with an example embodiment of the present invention.

FIG. 4 shows a schematic depiction of a further example of a network being operated in accordance with certain example embodiments of the present invention. FIG. 4 shows two segments of that network 200A, 200B which comprise, respectively, routers $210A_1$, $210A_2$, $210A_3$, $210A_4$, $210B_1$, $210B_2$, $210B_3$, and $210B_4$ and which are in communication with network segment management modules 300A and 300B respectively. Both network segments 200A & 200B are within a region of the network controlled by a common supervisory management module (not shown for the sake of clarity). Assume that a VoIP call is being routed across the network segments and traverses the path $210A_1 \rightarrow 210A_2 \rightarrow 210A_3 \rightarrow 210B_1 \rightarrow 210B_2 \rightarrow 210B_3 \rightarrow 210B_4$, which is shown in FIG. 4 by dashed arrows. The QoS requirements for a segment 200A will be stored in a table in network segment management module 300A and may be as shown below in Table 1:

TABLE 1

Exemplary QoS data for network segment 200A

| Parameter | Bit Rate ($BR_A$) | Loss ($L_A$) | Delay ($D_A$) | Jitter ($J_A$) |
|---|---|---|---|---|
| Threshold | 6 kb/s | 1% | 50 ms | 10 ms |

In a case where the link between routers $210A_2$ and $210A_3$ becomes congested then it may no longer be possible for the route to meet the delay threshold for that segment. If it is not possible to re-route within segment 200A such that the delay threshold can be satisfied then it will be necessary to re-route the traffic via a different network segment. Thus, the segment management module 300A will send a request to the supervisory management module that the VoIP session be routed outside of segment 200A. In order to process this request, the supervisory module will have access to the following information:

- periodic performance reports of all the network entities in the end-to-end session. This information may be provided directly from each of the segment management modules in the end-to-end session or may be accessed from a network management database.
- the QoS table for each of the segments in that end-to-end session (it will be understood that the end-to-end session may cross more network segments than the exemplary segments shown in FIG. 4). These tables may be obtained from a network management database or may be reported by each of the segment management modules in the end-to-end session.
- a set of policies and QoS reservation information for that particular class of service, in this case VoIP, which is being monitored by supervisory management module.

Figure 5:
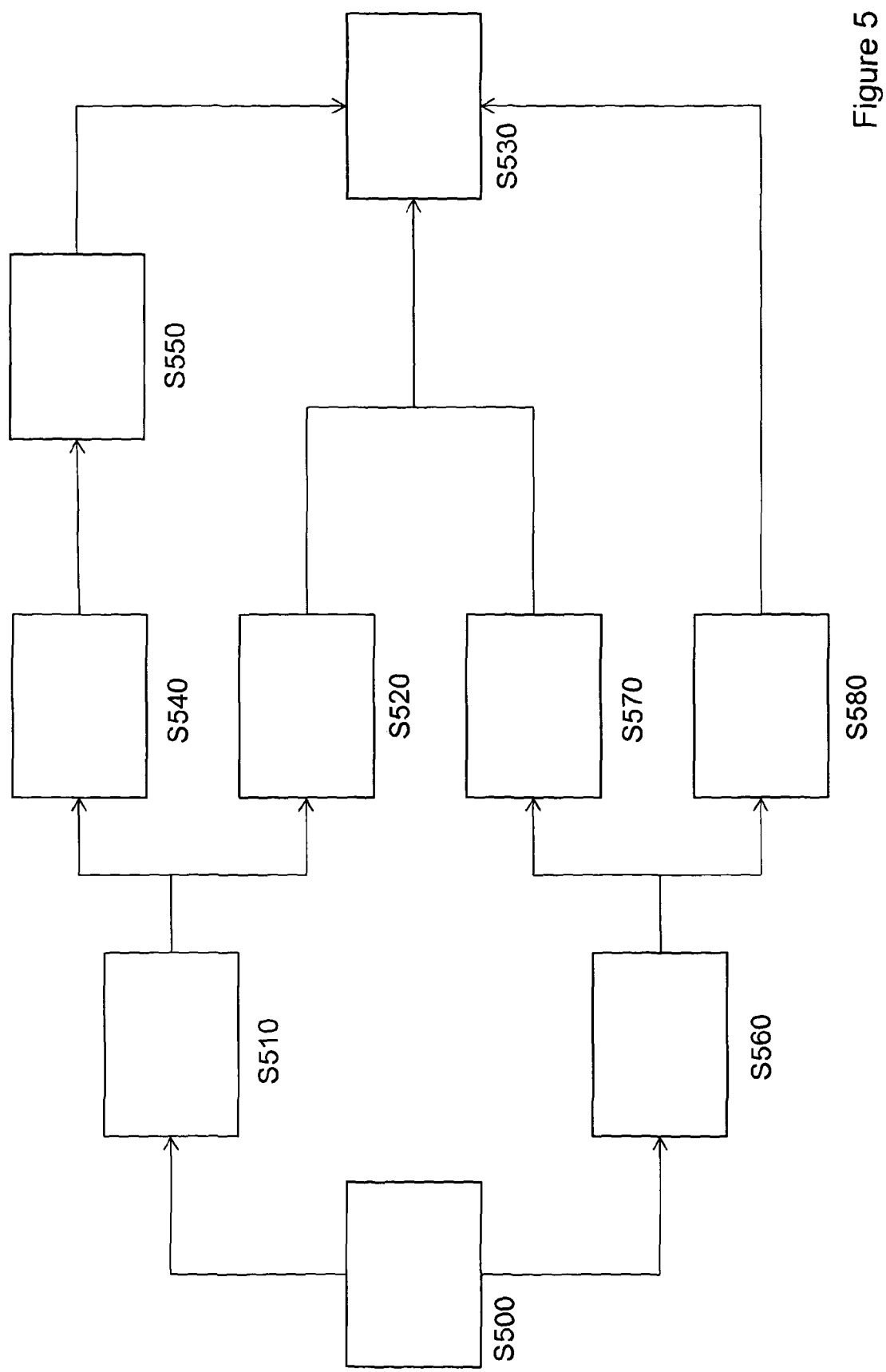
FIG. 5 shows a flowchart which provides a graphical depiction of a method according to an example embodiment of the present invention.

FIG. 5 shows a flowchart which provides a graphical depiction of a method according to certain example embodiments of the present invention. At step S500 the supervisory module compares the predicted performance of each of the network segments that comprise the end-to-end route against the respective QoS thresholds. If one or more of the network segments are predicted to have a performance that will be significantly better than their allocated thresholds then it may be possible to relax the QoS thresholds for network segment 200A. For example, a segment whose current average performance is at least two standard deviations below the threshold may be considered to be performing significantly better than their threshold. At step S510 the impact of the breach of the QoS thresholds is assessed. If the impact is slight, for example, less than 5%, that is that the relevant QoS measures are predicted to be only slightly above the allocated threshold and/or that the breach of the QoS threshold is predicted to only last for a limited duration before decreasing below the QoS threshold then the supervisory module will (S520) instruct the segment management module to ignore the breach of the QoS thresholds, either for the duration of the session in question or for as long as the QoS breach is predicted to occur for. Once the ignore instruction has been sent to the segment management module then at step S530 the data relating to this decision is stored and the process ends.

If the impact of the breach of the QoS thresholds is determined to be significant then the supervisory module will, at S540, determine by what extent the QoS thresholds for one or more other network segments can be varied. For example, it may be that one segment, for example segment 200B, is performing significantly better than predicted such that the delay threshold for that segment could be reduced from 50 ms to 20 ms. This reduction in the delay threshold for that segment would allow the delay threshold for a further segment, for example segment 200A, to be relaxed to 80 ms. Alternatively, there may be three different segments for which the delay threshold could be reduced to 40 ms and this would still allow segment 200A to have an increased delay threshold of 80 ms. The new QoS parameters are then provided to the respective segment management nodes (S550), either by the supervisory module pushing the parameter values to the segment management nodes directly or by the supervisory module communicating the parameter values to the network management database and the segment management nodes polling the network management database to obtain the parameter values, or by some other method. Then at step S530 the various changes for the different network elements will be recorded and the process ends.

If none of the network segments are predicted to have a performance that will be significantly better than their allocated thresholds then a re-routing of the data will be initiated. If the segment management module 300A has sent a request to the supervisory module then it can be inferred that the segment management module is unable to perform a re-routing within that segment and thus it will be necessary to effect a re-routing that uses one or more further network segments. At step 560 the supervisory module will poll the router immediately preceding the overloaded link (or any entity from which it can obtain up-to-date IP routes), which in the present case is router 210A$_2$, to determine a list of next best hops which could replace the overloaded link. As the supervisory module can access predicted performance data for each of the network elements in the segments that it supervises, it is possible for the viability of the next best hops to be assessed. For the network session described above with respect to FIG. 4 it may be that the next best hop is from router 210A$_2$ to router 210B$_2$, bypassing routers 210A$_3$ and 210B$_1$. At step S570 the supervisory node will push data regarding the new route to the segment module 300A (and possibly also to segment module 300B) such that handover between the two segments can be negotiated, as described above. It may be necessary for a number of next best hops to be determined and for the VoIP data to be split and then re-routed across these different next best hops.

Figure 6:
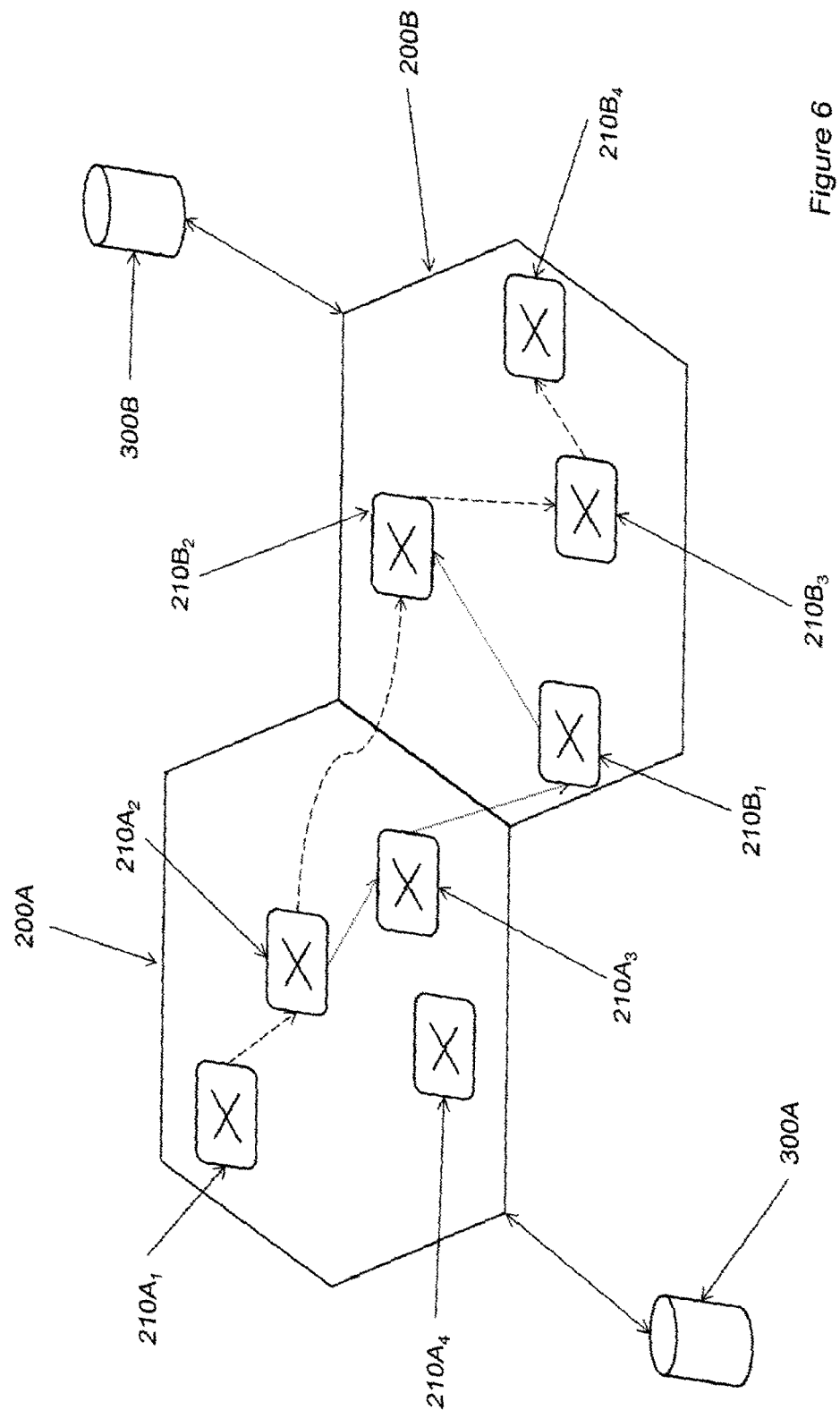
FIG. 6 shows a schematic depiction of a communications network after a network re-routing has been performed.

As the number of routers in the end-to-end path has changed, it may be necessary for the supervisory module to re-calculate the QoS parameters for those affected segments, and possibly for all of the segments which comprise the end-to-end network path. FIG. 6 shows a schematic depiction of such a network re-routing, with the active communication links depicted by a dashed line and the now inactive communications links shown with a dotted line. Once the handover has been agreed, and, if required, the QoS parameters have been updated, then at step S530 all of the changes to the network configuration will be saved.

In some situations it may be preferable to have a supervisory management module for each class of service, or a plurality of supervisory management modules, with each of the supervisory management modules managing one or more different classes of service. In the event that in step S560 it is not possible to determine a next best hop then the supervisory module will issue an alarm to the network operator to indicate that it has not been possible to deal with the overloaded communications link, either by modifying the QoS thresholds for a plurality of network segments, or by re-routing data within the network.

In summary, the present invention in certain example embodiments provides a communications network which is divided into a plurality of segments, with each segment comprising one or more routers and one or more communications links that connect the routers. Each of the segments also comprises a segment management module. Each of the segment management modules reports to a supervisory management module and the communications network may comprise one or more supervisory management modules. If a segment management module predicts that a QoS threshold will be breached then it may re-route a data flow within that segment. If such a re-route is not possible then it will send a request to its supervisory management module to initiate a re-routing to a further segment.

It will be understood that some aspects of certain example embodiments of the present invention, for example the segment management module and the supervisory management module, amongst others, may be implemented by executing computer code on a general purpose computing apparatus. It should be understood that the structure of the general purpose computing apparatus is not critical as long as it is capable of executing the computer code which performs a method according to certain example embodiments of the present invention. Such computer code may be deployed to such a general purpose computing apparatus via download, for example via the internet, or on some physical media, for example, DVD, CD-ROM, USB memory stick, etc.

The invention claimed is:

1. A communications network comprising:
a plurality of network segments, each of the plurality of network segments comprising a segment management module, one or more routers, and a plurality of communications links, the communications links connecting each router to one or more other routers; the communications network further comprising a supervisory management module; wherein a flow of data between a first endpoint and a second endpoint will pass through a set of the plurality of network segments to provide an end-to-end route to meet an end-to-end quality of service (QoS) threshold, wherein, in use, the network is configured such that each segment management module predicts the performance of the or each router in the respective segment that carries a data flow based on operational data reported by the or each router and in response to the predicted performance exceeding a threshold value, that segment management module is configured to:
(a) identify an alternative routing for the data flow within that network segment; and
(b) in response to an alternative routing for the data flow being not found within that network segment, send a report to the supervisory management module, the supervisory management module being configured to, in use,
  (i) apportion the end-to-end QoS threshold between the segments providing the end-to-end route;
  (ii) increase the segment QoS threshold for the network segment that generated the report;
  (iii) decrease the segment QoS threshold for one or more other network segments that carry the flow of data, so that the end-to-end QoS threshold remains unchanged;
  (iv) permit the segment management module that sent the report to continue to provide a portion of the end-to-end-route;
wherein the communications network is a segmented network in which the plurality of network segments are arranged; and
wherein, in use, the supervisory management module is configured to permit the segment management module that generated the report to re-route the data flow to a further network segment.

2. A communications network according to claim 1, wherein, in use, the supervisory management module is configured to identify a router within a further network segment for the data flow to be re-routed to.

3. A communications network according to claim 2, wherein, in use, the supervisory management module is further configured to identify additional re-routings such that the data flow is routable to an original destination thereof.

4. A communications network according to claim 1, further comprising a network management database provided external to the plurality of network segments, the network management database being configured to store QoS parameters, the network management database being updatable over time and also being queryable by the segment management modules to provide, for each of the segment management modules, an array that states, for a given service flowing through the network, maximum allowable QoS parameters for the respective segments in order to ensure that the end-to-end QoS satisfies an associated service level agreement.

5. A communications network according to claim 1, wherein the communications network is a multi-level hierarchical segmented network in which the plurality of network segments are arranged.

6. A communications network comprising:
a plurality of network segments, each of the plurality of network segments comprising a segment management module, one or more routers, and a plurality of communications links, the communications links connecting each router to one or more other routers; the communications network further comprising a supervisory management module; wherein a flow of data between a first endpoint and a second endpoint will pass through a set of the plurality of network segments to provide an end-to-end route to meet an end-to-end quality of service (QoS) threshold, wherein, in use, the network is configured such that each segment management module predicts the performance of the or each router in the respective segment that carries a data flow based on operational data reported by the or each router and in response to the predicted performance exceeding a threshold value, that segment management module is configured to:
(a) identify an alternative routing for the data flow within that network segment; and
(b) in response to an alternative routing for the data flow being not found within that network segment, send a report to the supervisory management module, the supervisory management module being configured to, in use,
(i) apportion the end-to-end QoS threshold between the segments providing the end-to-end route;
(ii) increase the segment QoS threshold for the network segment that generated the report;
(iii) decrease the segment QoS threshold for one or more other network segments that carry the flow of data, so that the end-to-end QoS threshold remains unchanged; and
(iv) permit the segment management module that sent the report to continue to provide a portion of the end-to-end-route;
wherein the communications network is a segmented network in which the plurality of network segments are arranged; and
wherein, in use, the supervisory management module is configured to send an instruction to the segment management module that generated the report to ignore that the predicted performance will exceed the threshold value.

7. A communications network according to claim 6, wherein, in use, the supervisory management module is configured to send the instruction to the segment management module if the predicted performance will exceed the threshold value for a limited period of time.

8. A communications network according to claim 6, wherein, in use, the supervisory management module is configured to send the instruction to the segment management module if the predicted performance will only exceed the threshold value by a limited amount.

9. A method of managing a communications network, the communications network comprising: a plurality of network segments, each of the plurality of network segments comprising a segment management module, one or more routers, and a plurality of communications links, the communications links connecting each router to one or more other routers; the communications network further comprising a supervisory management module; wherein a flow of data between a first endpoint and a second endpoint will pass through a set of the plurality of network segments to provide an end-to-end route to meet an end-to-end quality of service (QoS) threshold, the method comprising:
causing each segment management module to predict the performance of the or each router in the respective segment that carries a data flow based on operational data reported by the or each router and in response to the predicted performance exceeding a threshold value, causing that segment management module to further:
(a) identify an alternative routing for the data flow within that network segment; and
(b) in response to an alternative routing for the data flow being not found within that network segment, send a report to the supervisory management module, the supervisory management module being configured to, in use,
(i) apportion the end-to-end QoS threshold between the segments providing the end-to-end route;
(ii) increase the segment QoS threshold for the network segment that generated the report;
(iii) decrease the segment QoS threshold for one or more other network segments that carry the flow of data, so that the end-to-end QoS threshold remains unchanged; and
(iv) permit the segment management module that sent the report to continue to provide a portion of the end-to-end-route; and
(c) enabling the segment management module that generated the report to re-route the data flow to a further network segment, based on permission from the supervisory management module;
wherein the communications network is a segmented network in which the plurality of network segments are arranged.

10. A method according to claim 9, wherein, in use, the supervisory management module is configured to identify a router within a further network segment for the data flow to be re-routed to.

11. A method according to claim 10, wherein, in use, the supervisory management module is further configured to identify additional re-routings such that the data flow is routable to an original destination thereof.

12. A method according to claim 9, wherein, in use, the supervisory management module is configured to send an instruction to the segment management module that generated the report to ignore that the predicted performance will exceed the threshold value.

13. A method according to claim 9, wherein the communications network is a multi-level hierarchical segmented network in which the plurality of network segments are arranged.

14. A non-transitory computer readable storage medium comprising computer executable code for managing a communications network, the communications network comprising: a plurality of network segments, each of the plurality of network segments comprising a segment management module, one or more routers, and a plurality of communications links, the communications links connecting each router to one or more other routers; the communications network further comprising a supervisory management module; wherein a flow of data between a first endpoint and a second endpoint will pass through a set of the plurality of network segments to provide an end-to-end route to meet an end-to-end quality of service (QoS) threshold, the computer executable code comprising instructions that, when executed, cause each segment management module to perform functionality comprising:

predicting the performance of the or each router in the respective segment that carries a data flow based on operational data reported by the or each router and in response to the predicted performance exceeding a threshold value, that segment management module further:

(a) identifying an alternative routing for the data flow within that network segment; and
(b) in response to an alternative routing for the data flow being not found within that network segment, sending a report to the supervisory management module, the supervisory management module being configured to, in use,
  (i) apportion the end-to-end QoS threshold between the segments providing the end-to-end route;
  (ii) increase the segment QoS threshold for the network segment that generated the report;
  (iii) decrease the segment QoS threshold for one or more other network segments that carry the flow of data, so that the end-to-end QoS threshold remains unchanged; and
  (iv) permit the segment management module that sent the report to continue to provide a portion of the end-to-end-route;

wherein, in use, the supervisory management module is configured to permit the segment management module that generated the report to re-route the data flow to a further network segment; and wherein the communications network is a segmented network in which the plurality of network segments are arranged.

15. A non-transitory computer readable storage medium according to claim 14, wherein, in use, the supervisory management module is configured to identify a router within a further network segment for the data flow to be re-routed to.

16. A non-transitory computer readable storage medium according to claim 15, wherein, in use, the supervisory management module is further configured to identify additional re-routings such that the data flow is routable to an original destination thereof.

17. A non-transitory computer readable storage medium according to claim 14, wherein, in use, the supervisory management module is configured to send an instruction to the segment management module that generated the report to ignore that the predicted performance will exceed the threshold value.

18. A non-transitory computer readable storage medium according to claim 17, wherein, in use, the supervisory management module is configured to send the instruction to the segment management module if the predicted performance will exceed the threshold value for a limited period of time.

19. A non-transitory computer readable storage medium according to claim 17, wherein, in use, the supervisory management module is configured to send the instruction to the segment management module if the predicted performance will only exceed the threshold value by a limited amount.

20. A non-transitory computer readable storage medium according to claim 14, wherein the communications network is a multi-level hierarchical segmented network in which the plurality of network segments are arranged.

* * * * *